US007201952B2

(12) United States Patent
Iftime et al.

(10) Patent No.: US 7,201,952 B2
(45) Date of Patent: Apr. 10, 2007

(54) LOW VOLTAGE E-PAPER

(75) Inventors: Gabriel Iftime, Mississauga (CA); Peter M. Kazmaier, Mississauga (CA)

(73) Assignee: Xerox Corporation, Stamford, CT (US)

( * ) Notice: Subject to any disclaimer, the term of this patent is extended or adjusted under 35 U.S.C. 154(b) by 243 days.

(21) Appl. No.: 11/003,812

(22) Filed: Dec. 3, 2004

(65) Prior Publication Data

US 2006/0119784 A1 Jun. 8, 2006

(51) Int. Cl.
*C09K 19/52* (2006.01)
*C09K 19/36* (2006.01)
*C09K 19/54* (2006.01)

(52) U.S. Cl. ............... 428/1.1; 252/299.01; 252/299.5; 252/299.7; 349/176

(58) Field of Classification Search ................. 428/1.1, 428/1.3; 252/299.5, 299.7, 299.01; 349/175, 349/176, 185
See application file for complete search history.

(56) References Cited

U.S. PATENT DOCUMENTS 3,697,150 A * 10/1972 Wysocki ...................... 349/33
5,691,798 A 11/1997 Smith
6,767,480 B2 7/2004 Iftime et al.
6,824,708 B2 11/2004 Iftime et al.
2004/0115366 A1 6/2004 Iftime et al.

FOREIGN PATENT DOCUMENTS

EP 1439125 * 7/2004

* cited by examiner

*Primary Examiner*—Shean C Wu
(74) *Attorney, Agent, or Firm*—Eugene O. Palazzo; Fay Sharpe LLP

(57) ABSTRACT

A cholesteric display including a liquid crystalline mixture having a dipolar dopant dissolved in the liquid crystalline mixture and the resulting mixture is reflecting light in the visible range of the spectrum when in planar state. In accordance with another aspect, a process includes forming a composition with a dipolar molecule to result in a liquid crystal dipolar dopant, and liquid crystal is added to the composition. In accordance with still another aspect, a device includes a liquid crystal composition includes a cholesteric liquid and a dipolar dopant. The liquid crystal composition is switchable between a focal-conic state and a planar state in the presence of an electric field and is stable in the respective state when the electric field is removed.

10 Claims, 4 Drawing Sheets

OBSERVER
28
24
26
EF
22
16
BLACK STATE: 25V APPLIED IN ONE DIRECTION

OBSERVER
32
26
22
EF
24
16
COLORED STATE: SHORT PULSE OF 25V APPLIED IN OPPOSITE DIRECTION

OBSERVER
30
24
26
EF
22
16
BLACK STATE: OPPOSITE 25V APPLIED FOR LONGER TIME

LOW VOLTAGE E-PAPER

BACKGROUND

Illustrated herein in embodiments are liquid crystal displays and, more specifically, bistable cholesteric liquid crystal displays (LCDs).

Cholesteric liquid crystal displays have attracted attention in recent years as an electronic paper (e-paper) type of display device. The cholesteric liquid crystal display is capable of utilizing reflection from surrounding lights as a light source and has a storage property which can hold display contents after the supply voltage is turned off. Further, because an active matrix is not needed for driving the display, cholesteric liquid crystal display devices are capable of providing large-capacity displays, and may use a flexible substrate which is particularly suitable for e-paper.

The cholesteric liquid crystal is made up of spirally oriented rod-like molecules (mesogens), and exhibits a selective reflection phenomenon that reflects a light of a wavelength corresponding to a spiral pitch. The cholesteric liquid crystal display elements utilize this phenomenon. The cholesteric molecules can, under appropriate conditions, be in one of several different general orientations, namely, a planar orientation, a finger-print orientation, a focal-conic orientation, and a homeotropic orientation, as shown in FIGS. 1A–1B respectively.

The planar orientation shown in FIG. 1A is a state in which the cholesteric molecules 10 are aligned between two substrates 12, 14 in a helical spiral axis oriented vertical to the substrate plane. Cholesteric liquid crystals in the planar texture possess the optical property of separating incident white light into its left and right-hand circular components by reflecting one component and transmitting the other. This is due to the regular helical alignment of the cholesteric molecules in a spatially periodic twisted helical structure. For suitably chosen pitches, the reflected component is in the visible range, i.e., from about 400 nm to about 730 nm, giving rise to a selective color being observed.

The finger-print orientation shown in FIG. 1B is a state in which the spiral axis is oriented essentially parallel to the substrate plane. In practice, because of the anchoring effect of the surfaces of the cell, there are defects in this orientation and the helical axes of the domains may be more or less randomly oriented through the cell. This state is referred to as focal-conic and is schematically shown in FIG. 1C. The focal-conic state is made up of multiple domains, each having the same helical pitch, with the helical axes arranged approximately parallel to the substrates. In the focal-conic state, the cell is weakly scattering (nearly transparent) and transmits most of the incident light. When the bottom of the display is coated with a light absorptive layer 16, the color of the absorptive layer 16 is observed, which is usually black.

The homeotropic orientation shown in FIG. 1D is a state in which the spiral structure is decomposed and the cholesteric molecules 10 are oriented perpendicular to the substrate plane, also in a colorless state, and the color of the light absorptive layer 16 is observed.

To date cholesteric display technology has frequently employed switching between the planar state and the focal-conic state by means of electric fields being applied between electrodes 18, 20 affixed or adjacent to the substrates 12, 14. To obtain the reflective colored state, a relatively high voltage is necessary, up to 100–200 V for example, depending on the liquid crystal and the thickness of the display. For this reason, it is difficult to use such a display for fabrication of electronic paper, which ideally should use a low voltage for switching, preferably low enough that the display could be operated utilizing a battery power source for example.

Therefore, there is a need for a means of switching a cholesteric display with a lower voltage than presently required, thereby providing a more practical embodiment of electronic paper which consumes less power than present designs.

BRIEF DESCRIPTION

In accordance with one embodiment of the disclosure, there is provided a bistable cholesteric display including a cholesteric liquid crystalline mixture having a dipolar dopant dissolved in the cholesteric liquid crystalline mixture.

In accordance with another embodiment of the disclosure, there is provided a process including forming a composition with a dipolar molecule to result in a liquid crystal dipolar dopant, and adding a liquid crystal to the composition.

In accordance with still another embodiment of the disclosure, there is provided a device having a liquid crystal composition including a cholesteric liquid and a dipolar dopant. The liquid crystal composition is switchable between a focal-conic state and a planar state in the presence of an electric field and is stable in the respective state when the electric field is removed.

These and other non-limiting aspects of the development are more particularly disclosed below.

BRIEF DESCRIPTION OF THE DRAWINGS

The following is a brief description of the drawings, which are presented for the purposes of illustrating the development disclosed herein and not for the purposes of limiting the same.

DETAILED DESCRIPTION

Figure 1A:
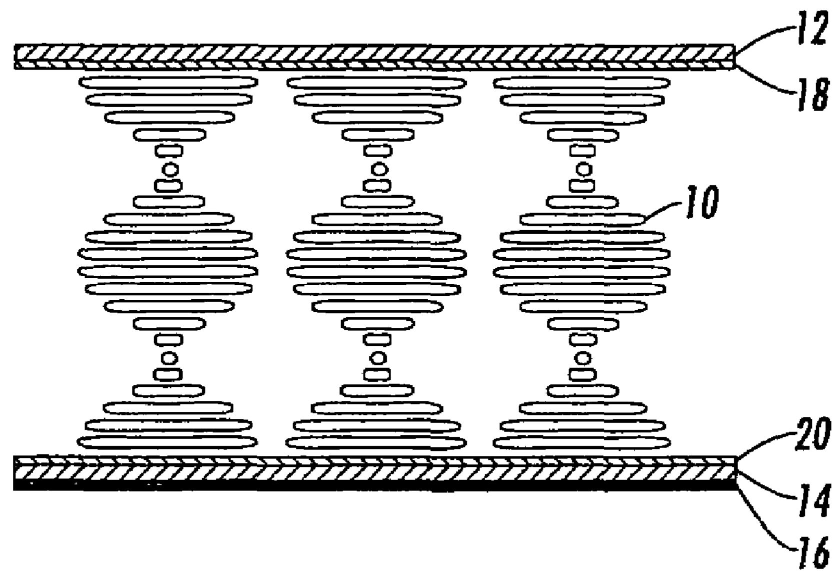
FIG. 1A is a simplified elevational view of a conventional cholesteric liquid crystal display device in a planar state.
Figure 1B:
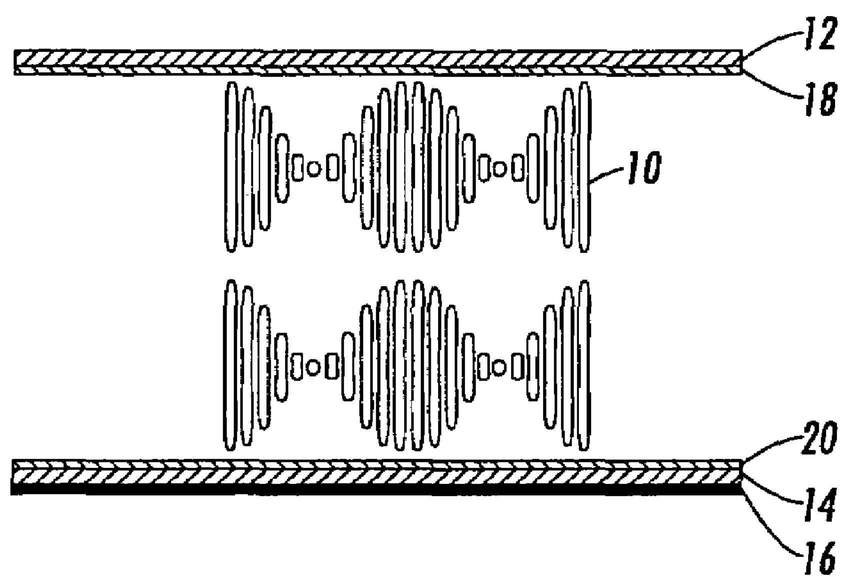
FIG. 1B is a simplified elevational view of a conventional cholesteric liquid crystal display device in a finger-print state.
Figure 1C:
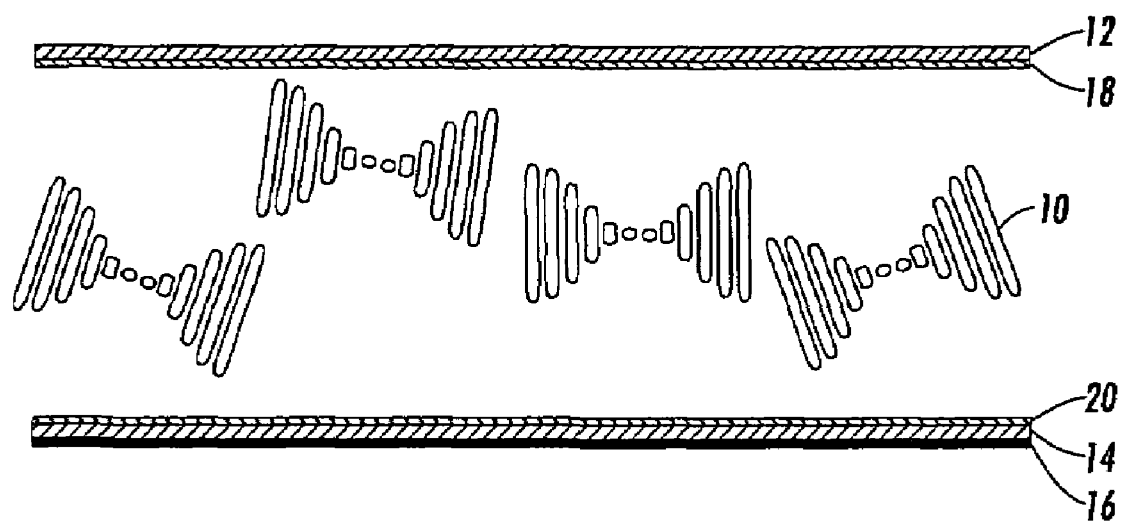
FIG. 1C is a simplified elevational view of a conventional cholesteric liquid crystal display device in focal-conic state.
Figure 1D:
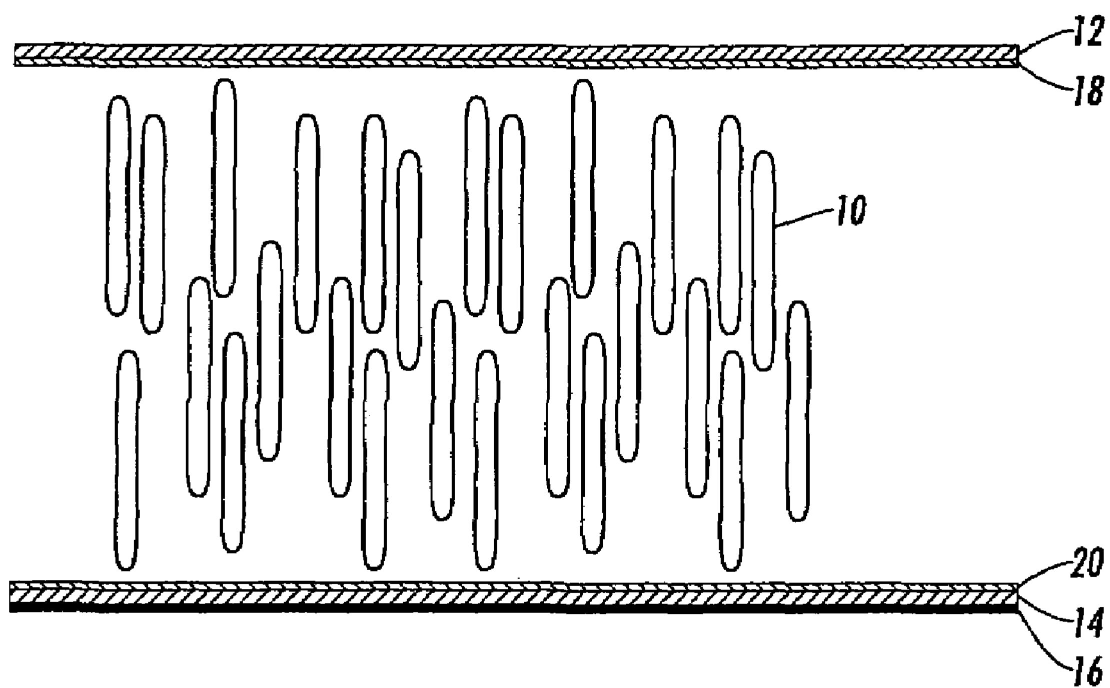
FIG. 1D is a simplified elevational view of a conventional liquid crystal display device in a homeotropic state.

This disclosure relates to a cholesteric display including a liquid crystalline mixture having a dipolar dopant dissolved in the liquid crystalline mixture and the resulting mixture is reflecting light in the visible range of the spectrum when in planar state. In accordance with another aspect, a process includes forming a composition with a dipolar molecule to result in a liquid crystal dipolar dopant, and liquid crystal is added to the composition. In accordance with still another aspect, a device includes a liquid crystal composition includes a cholesteric liquid and a dipolar dopant. The liquid crystal composition is switchable between a focal-conic state and a planar state in the presence of an electric field and is stable in the respective state when the electric field is removed.

A more complete understanding of the processes and apparatuses disclosed herein can be obtained by reference to the accompanying drawings. These figures are merely schematic representations based on convenience and the ease of demonstrating the present development, and are, therefore, not intended to indicate relative size and dimensions of the display devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Figure 2C:
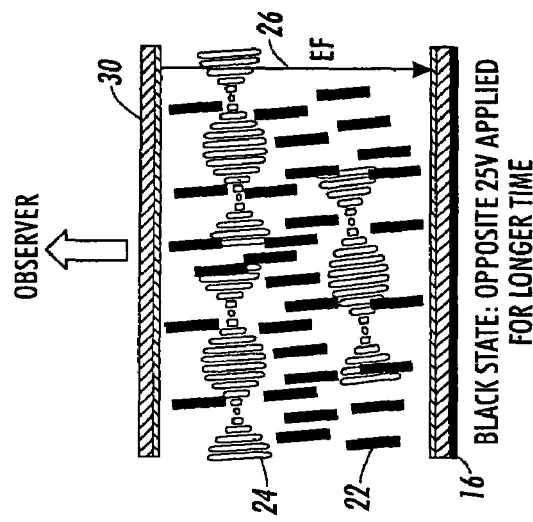
FIGS. 2A–2C are simplified elevational views of an embodiment of a liquid crystal display in a various states, and having a dipolar dopant.
Figure 2B:
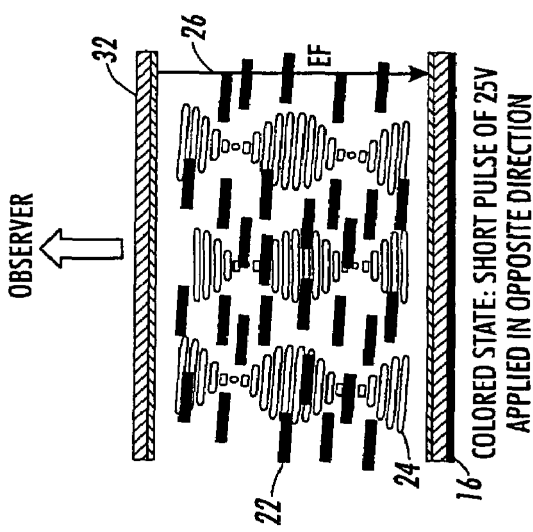
Figure 2A:
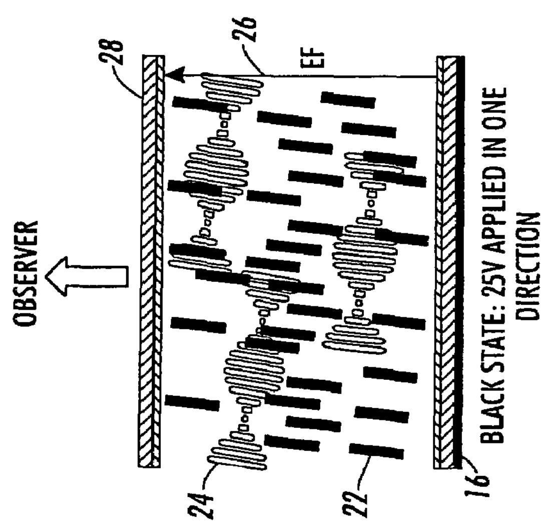

With reference to FIG. 2, embodiments of the present disclosure use dipolar molecules 22 as dopants in the cholesteric mixture 24 of a cholesteric display. The dipolar molecules 22 are electrically neutral molecules which carry a positive and a negative charge in one of their major canonical descriptions. Because of this, the dipolar molecules possess a unidirectional dipole moment which aligns essentially parallel to an externally applied electric field 26 such as shown in the first black state 28 as shown in FIG. 2A. When the direction of the applied electric field 26 is reversed, the dipolar molecules 22 will tend to reorient in the opposite direction, or in other words, rotate 180 degrees. If the reversed field is applied for a sufficiently long time, a second black state 30 is achieved as shown in FIG. 2C. However, if the electric field 26 is reversed, but applied for only a very short time (a short pulse), an intermediate planar, colored state 32 can be obtained. See FIG. 2B. Each of the two states, planar, i.e. colored and focal conic, i.e. transparent, is stable when the electric field is removed.

Suitable cholesteric liquid crystal mixtures include for example BL mixtures available from EM Industries, Inc. (BL088, BL 90, BL94 and BL108 as a few examples). The helical pitch is tuned to the desired range by mixing this cholesteric liquid crystal mixture with a nematic liquid crystal. Examples of nematic liquid crystal BL mixtures available at EM Industries, Inc., include BL001 (E7), BL002 (E8), BL033 (version of BL002) and BL087, and 5CB (commercially available at Sigma-Aldrich). The cholesteric liquid crystal composition is adjusted in such a way as to reflect light in the visible range (i.e., about 400 nm to about 730 nm) when is aligned in its planar state.

When the dipolar molecules 22 are present in the cholesteric mixture 24, the rotation of the dipolar molecules induced by application of the external electric field also induces rotation of the cholesteric helices, changing the appearance of the display. When, during the induced rotation, the helices are perpendicular to the display substrate, the colored planar state 32 is observed. When the helices are parallel to the substrate, or at least in a disordered random state, the cholesteric mixture appears transparent. If the display substrate opposite the observer is coated with a black absorptive layer, the observed color is black as represented by the first and second black states 28, 30. See FIGS. 2A and 2C.

Because the dipolar molecules possess the above-described positive and negative charges, they are more sensitive, or responsive, to an externally applied electric field when compared with the non-polar cholesteric liquid mixture. Therefore, cholesteric displays having dipolar molecules as dopants advantageously may be operated at a lower voltage when compared with conventional cholesteric displays.

The dipolar dopant 30 comprises an electron donor group and an electron acceptor group connected at the ends of a conjugated path. This results in the general structure: Donor—Conjugated Path—Acceptor. To ensure miscibility of the dipolar dopant and the liquid crystal, a liquid crystal compatibilizing moiety is attached to the dipolar dopant molecule. The electron donor is an atom or a group of atoms that have a negative Hammett parameter. The electron acceptor is a group of atoms having a positive Hammett parameter. Donor group is selected from an atom selected from the group consisting of N, O, S, and P, where the valence of the atom is satisfied by bonding to at least one other moiety to satisfy the valence of the atom; the other moiety or moieties to satisfy the valence of the atom selected as the electron donor moiety may be for instance a hydrogen atom, or short hydrocarbon group such as a straight alkyl chain having for example 1 to about 3 carbon atoms.

The conjugated bridging moiety may be any suitable group through which electrons can pass from the electron donor moiety (D) to the electron acceptor moiety (A). In embodiments, the conjugated bridging moiety (C) is a $\pi$-electron conjugated bridge that is composed of for example (there is no overlap among the categories (a), (b), and (c) described below):

(a) at least one aromatic ring such as one, two or more aromatic rings having for instance from about 6 carbon atoms to about 40 carbon atoms such as —C6H4-, and —C6H4-C6H4-;

(b) at least one aromatic ring such as one, two or more aromatic rings conjugated through one or more ethenyl or ethynyl bonds having for instance from about 8 carbon atoms to about 50 carbon atoms such as —C6H4-CH═CH—C6H4-, and —C6H4-C≡C—C6H4-; and (c) fused aromatic rings having for instance from about 10 to about 50 carbon atoms such as 1,4-C10H6 and 1,5-C10H6.

The electron acceptor moiety (A) may be any suitable atom or group capable of accepting electrons. In embodiments, the electron acceptor moiety (A) is an electron withdrawing functional moiety which-according to Hammett equation possesses a positive Hammett constant. The electron acceptor moiety may be for example the following:

(a) an aldehyde (—CO—H);

(b) a ketone (—CO—R) where R may be for example a straight chain alkyl group having for example 1 to about 3 carbon atoms, such as methyl, ethyl, propyl and isopropyl.

(c) an ester (—COOR) where R may be for example a straight chain alkyl group having for example 1 to about 3 carbon atoms, such as methyl, ethyl, propyl and isopropyl.

(d) a carboxylic acid (—COOH);

(e) cyano (CN);

(f) nitro (NO2);

(g) nitroso (N═O);

(h) a sulfur-based group (e.g., —SO2-CH3; and —SO2-CF3);

(i) a fluorine atom;

(k) a boron atom.

The liquid crystal compatibilizing moiety can be connected to the donor group, acceptor group or conjugated path group. The liquid crystal compatibilizing moiety (S) may be any suitable group that increases miscibility of the liquid crystal domain stabilizing compound with the liquid crystal.

The liquid crystal compatibilizing moiety (S) may be for example the following:

(a) a substituted or unsubstituted hydrocarbon having for example 1 to about 30 carbon atoms.

(b) a heterocyclic moiety having for example from 5 to about 15 atoms (referring to number of carbon atoms and heteroatom(s), where the heteroatom can be for instance N, O, S, P, and Se. Exemplary examples include: piperidine, ethyl-piperidine, methylpirrolidine.

(c) a hetero-acyclic moiety having for example from 5 to about 15 atoms (referring to number of carbon atoms and heteroatom(s), where the heteroatom can be for instance N, O, S, P, and Se. Exemplary examples include: glycol and polyglycol ethers, alcohol moieties like for example 2-hydroxy-ethyl, and thiol moieties like for example ethyl-2-methyl-ethyl-thioether.

In embodiments, the liquid crystal compatibilizing moiety (S) may be a hydrocarbon optionally substituted with for example a liquid crystal moiety, a heterocyclic moiety optionally substituted with for example a liquid crystal moiety, or a hetero-acylic moiety optionally substituted with for example a liquid crystal moiety.

The dipolar dopant can be a small molecule or a macromolecule. A macromolecule type of dipolar dopant requires that the precursor monomer to have at least one polymerizable group (Z). The polymerizable moieties may be any monomers that can be polymerized to form an oligomer/polymer. Suitable monomers include those having a double bond (—CH═$CH_2$) or triple bond capable of being polymerized such as acryl or ethenyl.

Figure 3:
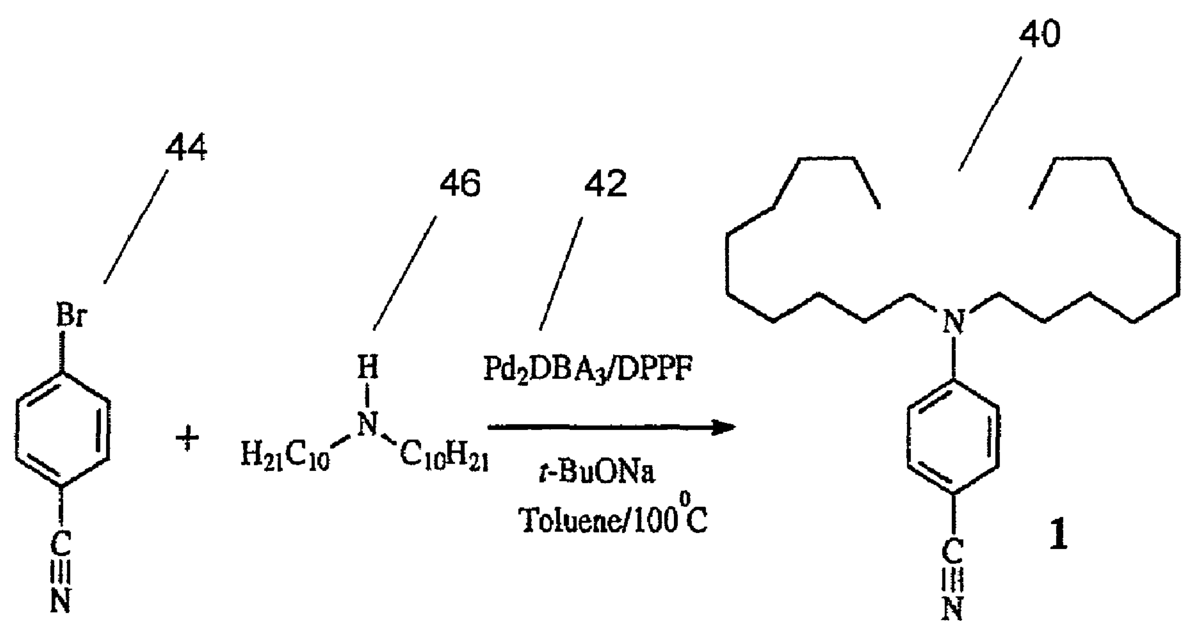
FIG. 3 depicts a process for producing a dipolar dopant according to embodiments of the present disclosure.

In one embodiment, with reference to FIG. 3, to ensure a good miscibility between the dipolar dopant and the cholesteric liquid crystal, a push-pull molecule 40 containing long alkyl chains is synthesized. The molecule 40 is obtained by a palladium catalyzed coupling reaction 42 between 4-bromo-benzonitrile 44 and the corresponding secondary amine 46.

Ten percent of the push-pull molecule 40 is dissolved in a cholesteric mixture. The resulting liquid crystalline mixture is cholesteric at room temperature. Suitable liquid crystalline materials are available from suppliers such as Merck & Co., Inc. The resulting cholesteric mixture is sandwiched between two indium-tin-oxide (ITO) coated glass slides. ITO coatings provide an electrically conductive surface that at the same time offers a high optical transparency. The bottom of the display is coated with a black absorptive layer. The thickness of the cholesteric layer is fixed, for example, by using glass spacers.

A range of dipolar dopants can be used. This range can be varied from very low concentrations (for example 1% by weight) to high concentrations. However, the high concentration is limited by the miscibility or compatibility of the dopant in the liquid crystalline mixture.

With reference again to FIG. 2, when a 25 V electric field 26 is applied in a vertical direction a shown in the figure, perpendicular to the substrates, the display assumes a black appearance to an observer due to the black absorptive layer 16 and the transparency of the cholesteric mixture 24 in the focal-conic black state 28.

If the electric field is removed, the black color is maintained. However, when the same voltage is applied in the opposite direction for a short period of time, less than 1 second for example, the sample takes on a colored state 32 due to the aforementioned optical property of selective reflection by cholesteric molecules in a planar state, giving rise to a selective color being observed such as white-green for example. This state is also stable after the electrical field is turned off. If the electric field 26 is re-applied in any direction, the display again becomes black as viewed by the observer. By comparison, a display made of the same cholesteric liquid crystal mixture, but without the dipolar dopant added, requires a voltage higher than 100 V to obtain the colored state.

Planar alignment layers may be optionally be coated on the surface of the electrodes. This results in improved planar alignment of the helices in the color reflecting state which provides more saturated reflected color. Surface alignment layers for planar alignment are known and they include for example thermally cross-linkable polyimides as for example those produced by Nissan Chemical Ind., Ltd. Improved planar alignment is provided by rubbing the polyimide coated substrates.

It is to be appreciated that selective areas of a display and surrounding areas can be switched independently so that an image can be generated on the display, and stored when the voltage providing the external electric field is turned off, thereby removing the electric field or fields. Each of selective display areas can be switched as necessary, to either a black or colored state.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A device comprising a liquid crystal composition including a cholesteric liquid crystal and a dipolar dopant, wherein the liquid crystal composition reflects light in the visible range of the spectrum when in the planar state, is switchable between a focal-conic state and a planar state in the presence of an electric field, and is stable in the respective states when the electric field is removed.

2. The device of claim 1, wherein the liquid crystal composition is switchable between the focal-conic state and the planar state in the presence of an electric field generated by an applied electric field of approximately 4 volts/micron or less.

3. The device of claim 1, wherein the dipolar dopant is present in an amount of from about 1% by weight to the limit of compatibility of the dipolar dopant in the cholesteric liquid crystal.

4. The device of claim 1, wherein the dipolar dopant is present in an amount of from about 1% by weight to about 25% by weight of the dipolar dopant in the cholesteric liquid crystal.

5. The device of claim 1, wherein the dipolar dopant is present in an amount of from about 1% by weight to about 15% by weight of the dipolar dopant in the cholesteric liquid crystal.

6. The device of claim 1, wherein the dipolar dopant is present in an amount of from about 1% by weight to about 10% by weight of the dipolar dopant in the cholesteric liquid crystal.

7. The device of claim 1, further comprising:

an electric field generator that electrically induces the switching between the focal-conic state and the planar state.

8. The device of claim 1, further including a colored surface positioned to absorb a portion of a predetermined light that passes through the cholesteric liquid crystal in the focal-conic state such that an observer sees a predetermined color.

9. The device of claim 1, wherein the cholesteric liquid crystal is substantially transparent to the predetermined light when in the focal-conic state to allow passage of the predetermined light through the cholesteric liquid crystal, and to allow exit of the non-absorbed portion of the predetermined light from the cholesteric liquid crystal.

10. The device of claim 1, wherein the dipolar dopant is:

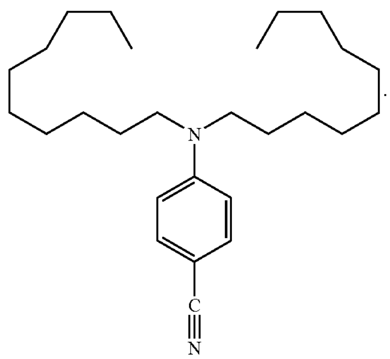

* * * * *